United States Patent
Chen et al.

(10) Patent No.: US 12,346,506 B2
(45) Date of Patent: Jul. 1, 2025

(54) SYNCHRONIZATION METHOD, WIRELESS COMMUNICATION CHIP, SYNCHRONIZATION DEVICE, ELECTRONIC DEVICE AND ACTIVE PEN

(71) Applicant: SHENZHEN GOODIX TECHNOLOGY CO., LTD., Guangdong (CN)

(72) Inventors: Xianpeng Chen, Guangdong (CN); Haolei Wang, Guangdong (CN); Hai Li, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/844,853

(22) Filed: Jun. 21, 2022

(65) Prior Publication Data
US 2023/0161425 A1 May 25, 2023

(30) Foreign Application Priority Data
Nov. 23, 2021 (CN) .......................... 202111391572.3

(51) Int. Cl.
*G06F 3/0354* (2013.01)
*G06F 3/038* (2013.01)
*H04W 56/00* (2009.01)

(52) U.S. Cl.
CPC ........ *G06F 3/03545* (2013.01); *G06F 3/0383* (2013.01); *G06F 2203/0384* (2013.01); *H04W 56/00* (2013.01)

(58) Field of Classification Search
None
See application file for complete search history.

(56) References Cited

U.S. PATENT DOCUMENTS

| 2017/0003767 A1* | 1/2017 | Holsen ................. G06F 3/0443 |
| 2017/0147140 A1* | 5/2017 | Kosugi ................. G06F 1/163 |

(Continued)

FOREIGN PATENT DOCUMENTS

| CN | 105468211 A | 4/2016 |
| CN | 106028272 A | 10/2016 |

(Continued)

*Primary Examiner* — Benjamin C Lee
*Assistant Examiner* — Emily J Frank
(74) *Attorney, Agent, or Firm* — Scully, Scott, Murphy & Presser, P.C.

(57) ABSTRACT

The present application provides a synchronization method and a synchronization device, which may effectively realize synchronization between a touch screen and the active pen. The synchronization method is configured for time synchronization between a first detection chip of a first device and a second detection chip of a second device, and the method includes: a first wireless communication chip connected to the first detection chip, receiving the first synchronization signal sent by the first detection chip at a first moment; the first wireless communication chip sending time information associated with the first moment to a second wireless communication chip connected to the second detection chip; and the time information being configured to determine a second moment for the first detection chip to send the synchronization signal next time, so that the second detection chip is synchronized with the first detection chip at the second moment.

13 Claims, 5 Drawing Sheets

(56) References Cited

U.S. PATENT DOCUMENTS

| | | | | |
|---|---|---|---|---|
| 2018/0164904 A1* | 6/2018 | Qiao | ............... | G06F 3/03545 |
| 2018/0188836 A1* | 7/2018 | Park | ............... | G06F 3/03545 |
| 2021/0084605 A1* | 3/2021 | Wu | ............... | H04J 3/06 |
| 2021/0124449 A1* | 4/2021 | Jang | ............... | G06F 3/0412 |
| 2022/0011881 A1* | 1/2022 | Miyamoto | ......... | G06F 3/04162 |
| 2022/0057909 A1* | 2/2022 | Lee | ............... | G06F 3/03545 |
| 2022/0326805 A1* | 10/2022 | Lin | ............... | G06F 3/04184 |

FOREIGN PATENT DOCUMENTS

| | | |
|---|---|---|
| CN | 111638814 A | 9/2020 |
| CN | 113489880 A | 10/2021 |
| WO | 2021/243573 A1 | 12/2021 |

\* cited by examiner

SYNCHRONIZATION METHOD, WIRELESS COMMUNICATION CHIP, SYNCHRONIZATION DEVICE, ELECTRONIC DEVICE AND ACTIVE PEN

CROSS-REFERENCE TO RELATED APPLICATIONS

This application claims priority to Chinese Patent Application No. 202111391572.3, filed on Nov. 23, 2021, which is hereby incorporated by reference in its entirety.

TECHNICAL FIELD

Embodiments of the present application relate to the technical field of touch and control, and more particularly, to a synchronization method, a wireless communication chip, a synchronization device, an electronic device and an active pen.

BACKGROUND

With the popularization of capacitive screens, the application of a capacitive active pen also becomes increasingly widespread. The protocol between an active pen and a touch screen is also constantly evolving, and its development trend has evolved from the early one-way communication to the current two-way communication. However, no matter which communication protocol is adopted, the connection between the touch screen and the active pen needs to be established according to the signal sending and receiving timing and period agreed in the protocol, so as to realize the collection of the coordinate signal of the active pen by the touch screen, thereby realizing the writing function of the active pen. It may be seen that the working premise of the active pen is to perform timing synchronization with the touch screen to establish a connection. For this reason, how to effectively realize the synchronization between the touch screen and the active pen has become an urgent problem to be solved.

SUMMARY

Embodiments of the present application provide a synchronization method, a wireless communication chip, a synchronization device, an electronic device, and an active pen, which may effectively realize synchronization between a touch screen and an active pen.

In a first aspect, provided is a synchronization method for time synchronization between a first detection chip of a first device and a second detection chip of a second device, the first detection chip periodically sending a synchronization signal, the method including:

a first wireless communication chip connected to the first detection chip, receiving the synchronization signal sent by the first detection chip at a first moment;

the first wireless communication chip sending time information associated with the synchronization signal to a second wireless communication chip connected to the second detection chip, where the time information is configured to determine a second moment for the first detection chip to send the synchronization signal next time, so that the second detection chip is synchronized with the first detection chip at the second moment.

Based on this technical solution, after the first wireless communication chip connected to the first detection chip received the synchronization signal sent by the first detection chip at the first moment, the time information associated with the synchronization signal will be sent to the second wireless communication chip connected to the second detection chip. The second device acquires the time information associated with the synchronization signal through the second wireless communication chip, and uses the first moment as a time anchor for sending the synchronization signal, so as to determine, based on the first moment, the second moment when the first detection chip sends the synchronization signal next time, thereby realizing synchronization between the second detection chip and the first detection chip. Since the wireless communication chip is configured to realize the synchronization between the touch screen and the active pen, the delay caused by the synchronization manner of blindly detecting a driving signal of the active pen on the touch screen is avoided, and a position of a pen tip may be detected immediately when the active pen is close to the touch screen, which speeds up a response speed of the first writing of the active pen, and may maintain the touch screen and the active pen synchronized for a long time, and improve the user experience.

In a possible implementation manner, the time information is configured to determine a first time difference between a third moment when the second wireless communication chip receives the time information and the first moment, where the first moment different is configured to determine the second moment.

In a possible implementation manner, the second moment is located at a certain duration after the third moment, and the duration is equal to a difference value of a period length of the synchronization signal sent by the first detection chip and the first time difference.

In a possible implementation manner, the first wireless communication chip performs data transmission with the second wireless communication chip based on its connection period, and the time information is a second time difference between a fourth moment when the first wireless communication chip receives the synchronization signal and a fifth moment when the first wireless communication chip performs data transmission with the second wireless communication chip for the last time.

In a possible implementation manner, the first time difference is equal to a difference value between the second time difference and a preset value, where the preset value is equal to the sum of the following times:

a length of the connection period;

a data transmission time between the first wireless communication chip and the second wireless communication chip; and a delay between the fourth moment and the first moment.

In a possible implementation manner, the synchronization signal is the last synchronization signal received by the first wireless communication chip within the connection period.

In a possible implementation manner, the first wireless communication chip and the second wireless communication chip are any one of the following: a BLE chip, a WIFI chip, an RF chip, and an NFC chip.

In a possible implementation manner, the first device is one of a touch screen and an active pen of an electronic device, and the second device is the other of the touch screen and the active pen.

In a second aspect, provided is a synchronization method for time synchronization between a first detection chip of a first device and a second detection chip of a second device, the first device being one of a touch screen and an active pen of an electronic device, the second device being the other of the touch screen and the active pen, and the first detection chip periodically sending a synchronization signal, the method including:

acquiring time information associated with the synchronization signal sent by the first wireless communication chip connected to the first detection chip to the second wireless communication chip connected to the second detection chip, where the synchronization signal is sent by the first detection chip at a first moment; and determining, according to the time information, a second moment for the first detection chip to send the synchronization signal next time, so that the second detection chip is synchronized with the first detection chip at the second moment.

Based on this technical solution, the second wireless communication chip connected to the second detection chip may receive the time information associated with the synchronization signal sent by the first wireless communication chip connected to the first detection chip, and the synchronization signal is sent by the first detection chip at the first moment. The second device acquires the time information associated with the synchronization signal through the second wireless communication chip, and uses the first moment as a time anchor for sending the synchronization signal, so as to determine, based on the first moment, the second moment when the first detection chip sends the synchronization signal in the next period, thereby realizing synchronization between the second detection chip and the first detection chip at the second moment. Since the wireless communication chip is configured to realize the synchronization between the touch screen and the active pen, the delay caused by the synchronization manner of blindly detecting a driving signal of the active pen on the touch screen is avoided, and a position of a pen tip may be detected immediately when the active pen is close to the touch screen, which speeds up a response speed of the active pen's first writing, and may maintain the touch screen and the active pen synchronized for a long time, and improve the user experience.

In a possible implementation manner, the according to the time information, a second moment for the first detection chip to send the synchronization signal next time, includes: determining, according to the time information, a first time difference between a third moment when the second wireless communication chip receives the time information and the first moment; and determining, according to the first time difference, the second moment.

In a possible implementation manner, the determining, according to the first time difference, the second moment, including: determining that the second moment is located at a certain duration after the third moment, and the duration is equal to a difference value of a period length of the synchronization signal sent by the first detection chip and the first time difference.

In a possible implementation manner, the first wireless communication chip performs data transmission with the second wireless communication chip based on its connection period, and the time information is a second time difference between a fourth moment when the first wireless communication chip receives the synchronization signal and a fifth moment when the first wireless communication chip performs data transmission with the second wireless communication chip for the last time.

In a possible implementation manner, the first time difference is equal to a difference value between the second time difference and a preset value, where the preset value is equal to the sum of the following times: a length of the connection period; a data transmission time between the first wireless communication chip and the second wireless communication chip; and a delay between the fourth moment and the first moment.

In a possible implementation manner, the synchronization signal is the last synchronization signal received by the first wireless communication chip within the connection period.

In a possible implementation manner, the first wireless communication chip and the second wireless communication chip are any one of the following: a BLE chip, a WIFI chip, an RF chip, and an NFC chip.

In a possible implementation manner, the synchronization method is performed by the second wireless communication chip or the second detection chip.

In a possible implementation manner, the first device is one of a touch screen and an active pen of an electronic device, and the second device is the other of the touch screen and the active pen.

In a third aspect, provided is a wireless communication chip, the wireless communication chip is a first wireless communication chip connected to a first detection chip of a first device, and configured for time synchronization between the first detection chip and a second detection chip of a second device, the first device is one of a touch screen and an active pen of an electronic device, the second device is the other of the touch screen and the active pen, the first detection chip periodically sends a synchronization signal, and the first wireless communication chip includes:

a receiving module, configured to receive the synchronization signal sent by the first detection chip at a first moment; and a sending module, configured to send time information associated with the synchronization signal to a second wireless communication chip connected to the second detection chip, where the time information is configured to determine a second moment for the first detection chip to send the synchronization signal next time, so that the second detection chip is synchronized with the first detection chip at the second moment.

In a possible implementation manner, the time information is configured to determine a first time difference between a third moment when the second wireless communication chip receives the time information and the first moment, where the first moment different is configured to determine the second moment.

In a possible implementation manner, the second moment is located at a certain duration after the third moment, and the duration is equal to a difference value of a period length of the synchronization signal sent by the first detection chip and the first time difference.

In a possible implementation manner, the first wireless communication chip performs data transmission with the second wireless communication chip based on its connection period, and the time information is a second time difference between a fourth moment when the first wireless communication chip receives the synchronization signal and a fifth moment when the first wireless communication chip performs data transmission with the second wireless communication chip for the last time.

In a possible implementation manner, the first time difference is equal to a difference value between the second time difference and a preset value, where the preset value is equal to the sum of the following times: a length of the connection period; a data transmission time between the first wireless communication chip and the second wireless communication chip; and a delay between the fourth moment and the first moment.

In a possible implementation manner, the synchronization signal is the last synchronization signal received by the first wireless communication chip within the connection period.

In a possible implementation manner, the first wireless communication chip and the second wireless communication chip are any one of the following: a BLE chip, a WIFI chip, an RF chip, and an NFC chip.

In a possible implementation manner, the first device is one of a touch screen and an active pen of an electronic device, and the second device is the other of the touch screen and the active pen.

In a fourth aspect, provided is a synchronization apparatus for time synchronization between a first detection chip of a first device and a second detection chip of a second device, the first detection chip periodically sending a synchronization signal, the synchronization apparatus including:

an acquisition module, configured to acquire time information associated with the synchronization signal sent by the first wireless communication chip connected to the first detection chip to the second wireless communication chip connected to the second detection chip, where the synchronization signal is sent by the first detection chip at a first moment; and a processing module, configured to determine, according to the time information, a second moment for the first detection chip to send the synchronization signal next time, so that the second detection chip is synchronized with the first detection chip at the second moment.

In a possible implementation manner, the processing module is specifically configured to: determine, according to the time information, a first time difference between a third moment when the second wireless communication chip receives the time information and the first moment; and determine, according to the first time difference, the second moment.

In a possible implementation manner, the processing module is specifically configured to: determine that the second moment is located at a certain duration after the third moment, where the duration is equal to a difference value of a period length of the synchronization signal sent by the first detection chip and the first time difference.

In a possible implementation manner, the first wireless communication chip performs data transmission with the second wireless communication chip based on its connection period, and the time information is a second time difference between a fourth moment when the first wireless communication chip receives the synchronization signal and a fifth moment when the first wireless communication chip performs data transmission with the second wireless communication chip for the last time.

In a possible implementation manner, the first time difference is equal to a difference value between the second time difference and a preset value, where the preset value is equal to the sum of the following times: a length of the connection period; a data transmission time between the first wireless communication chip and the second wireless communication chip; and a delay between the fourth moment and the first moment.

In a possible implementation manner, the synchronization signal is the last synchronization signal received by the first wireless communication chip within the connection period.

In a possible implementation manner, the first wireless communication chip and the second wireless communication chip are any one of the following: a BLE chip, a WIFI chip, an RF chip, and an NFC chip.

In a possible implementation manner, the synchronization apparatus is the second wireless communication chip or the second detection chip.

In a possible implementation manner, the first device is one of a touch screen and an active pen of an electronic device, and the second device is the other of the touch screen and the active pen.

In a fifth aspect, provided is a synchronization apparatus, including a processor and a memory, where the memory is configured to store a computer program; and the processor is configured to invoke and run the computer program stored in the memory, to perform the synchronization method in the first aspect or any possible implementation manner of the first aspect, or perform the synchronization method in the second aspect or any possible implementation manner of the second aspect.

In a sixth aspect, provided is an electronic device, including: the wireless communication chip in the third aspect or any possible implementation manner of the third aspect, or inducing the synchronization apparatus in the fourth aspect or any possible implementation manner of the fourth aspect; and a touch screen.

In a seventh aspect, provided is an active pen, including: the wireless communication chip in the third aspect or any possible implementation manner of the third aspect, or including the synchronization apparatus in the fourth aspect or any possible implementation manner of the fourth aspect; and an electrode, configured to output a driving signal.

DESCRIPTION OF EMBODIMENTS

The following describes technical solutions in the present application with reference to accompanying drawings.

Figure 1:
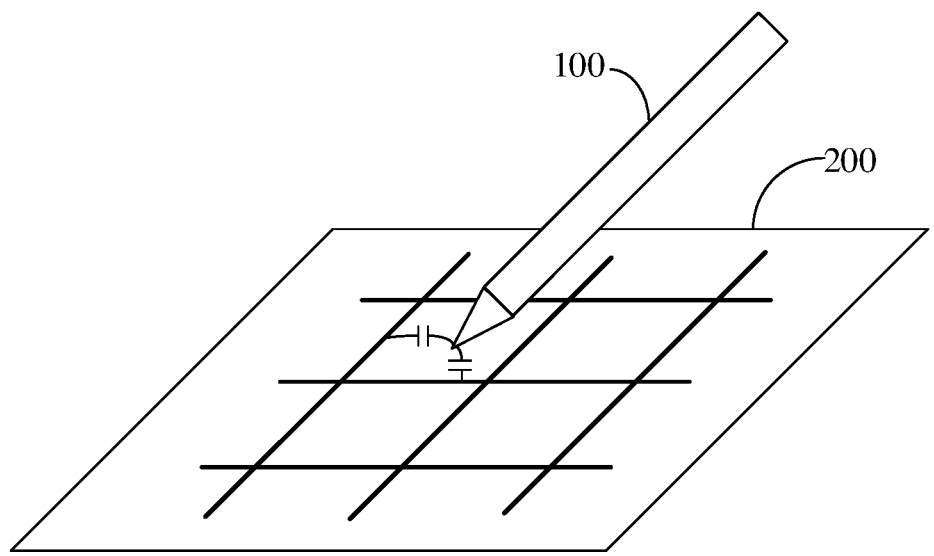
FIG. 1 is a schematic diagram of a principle of using an active pen on a touch screen.

When an active pen is actually used, a touch screen needs to acquire a pen tip coordinate of the active pen, so as to display a script of the active pen according to the pen tip coordinate. For example, as shown in FIG. 1, a certain number of horizontal and vertical detection electrodes are distributed on a screen 200, and if a driving signal output by a pen tip electrode of an active pen 100 acts at a certain position of the screen 200, horizontal and vertical detection electrodes corresponding to the position will generate a corresponding detection signal, such as a capacitance signal.

According to the detection signal, the position coordinate of the pen tip of the active pen 100 on the touch screen 200 may be calculated.

This driving signal may also be referred to as an excitation signal, a pen signal, etc., and is an electrical signal emitted by the pen tip electrode of the active pen for determining the coordinate of the pen tip.

The active pen and the touch screen are two independent systems. The touch screen may not predict when the user will use the active pen to write on the touch screen, that is, the touch screen may not determine when to start detecting the driving signal emitted by the active pen. Therefore, the active pen and the touch screen must be synchronized in timing, and the synchronization needs to be maintained for a long time during the writing process, so that the touch screen may stably and accurately detect the driving signal emitted by the active pen.

Generally, the synchronization between the touch screen and the active pen is realized by the following two methods. For an active pen that adopts the Microsoft Pen Protocol (MPP) protocol, the touch screen gradually aligns its detection period with a period of the active pen sending the driving signal by frequently detecting the driving signal of the active pen and adjusting its detection period; for an active pen that adopts the Universal Stylus Initiative (USI) protocol, the touch screen periodically sends a beacon signal, such as a Direct Sequence Spread Spectrum (DSSS) encoded signal, which is detected by the active pen; and when the active pen detects the correct beacon signal, it emits the driving signal according to the agreed delay, so as to realize the synchronization between the touch screen and the active pen.

Figure 2:
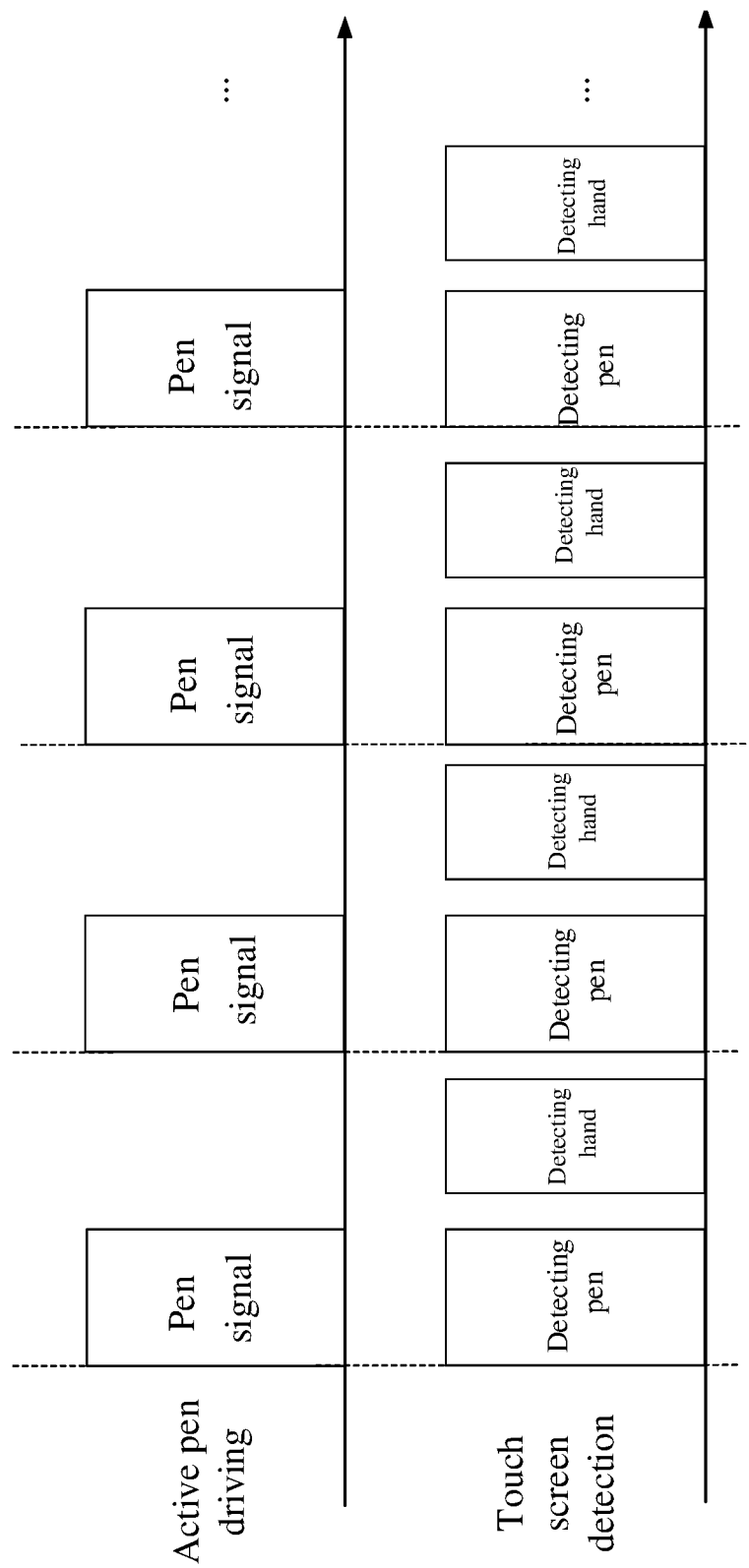
FIG. 2 is a schematic diagram of synchronization between a touch screen and an active pen.

For example, as shown in FIG. 2, when the period of the touch screen detecting the driving signal and the period of the active pen emitting the driving signal are aligned in timing, and a signal detection window of the touch screen and the window of the active pen sending the driving signal are consistent in timing, it means that synchronization is realized between the touch screen and the active pen. After synchronization, the touch screen may correctly detect the driving signal of the active pen, so as to calculate the touch information of the active pen, such as position, pressure, inclination angle and other information. In addition, as shown in FIG. 2, the active pen may also detect the touch of a finger during the time when the active pen is not detected.

However, in the above synchronization manner, the synchronization process between the touch screen and the active pen takes a long time, and generally requires one or two periods. Each period is usually 16 milliseconds, so a certain delay is introduced. In addition, because the height requirement of the touch screen to detect the driving signal of the active pen is generally only 5 mm to 10 mm, that is to say, the pen tip of the active pen is very close to the surface of the touch screen to start the synchronization, so the synchronization process has a certain delay, resulting in the slow response of the first writing of the active pen, affecting the user's writing experience.

In addition, the anti-interference ability of the above synchronization manner is poor. The noise of the display screen, the interference of the charger, the interference of the lamp flickering and other factors may affect the synchronization process, resulting in incorrect synchronization between the screen and the pen, disconnection of the pen writing, and even causing that the active pen may not be used normally. When the touch screen sends the beacon signal, the display effect of the display screen may also be affected because the driving voltage is too high, such as the screen flickering and the water ripple appeared on the display screen.

For this reason, the present application proposes a synchronization solution, in which time synchronization between the touch screen and the active pen is realized based on bluetooth communications. Because bluetooth has the advantages of a long transmission distance and a strong anti-interference ability, it may ensure the stability and reliability of the synchronization process, maintain long-term timing synchronization between the touch screen and the active pen, and may detect the pen tip position immediately when the active pen is close to the touch screen, which speeds up the first response.

However, if simply relying on the bluetooth device to directly send the synchronization signal, it is required that the connection period of the Bluetooth device, the detection period of the touch screen, and a driving period of the active pen should be consistent or in a relationship of an integer multiple during the operation of the active pen. Taking into account the design of the detection timing of the touch screen and the user's requirement for the refresh rate of coordinate detection, the detection frequency that the touch screen detects active pen is generally about 60 Hz, that is, the detection period is about 16.667 ms, where the pen tip coordinate of the active pen may be detected for four or six times in each period, to realize that the reporting rate of the coordinate is 240 Hz or 360 Hz. In order to take into account the period consistency of the three, the period of the three needs to be fixed at 16.25 ms, which limits the connection period of bluetooth, because the typical value of the connection period of the bluetooth device is generally 15 ms. Moreover, according to the bluetooth protocol, its connection period may be dynamically adjusted to be compatible with a plurality of bluetooth devices connected to the same device at the same time, and may reduce the power consumption of the bluetooth device by extending the connection period in the idle state. Therefore, fixing the connection period of the bluetooth device during the operation of the active pen may increase the power consumption of the bluetooth device and affect the compatibility of a plurality of bluetooth devices connected to the same device at the same time.

In order to better utilize the bluetooth device to realize the synchronization between the active pen and the touch screen, the embodiment of the present application uses a bluetooth chip to transmit time stamp information associated with the synchronization signal, and realizes the synchronization between the touch screen and the active pen based on the time stamp information.

Figure 3:
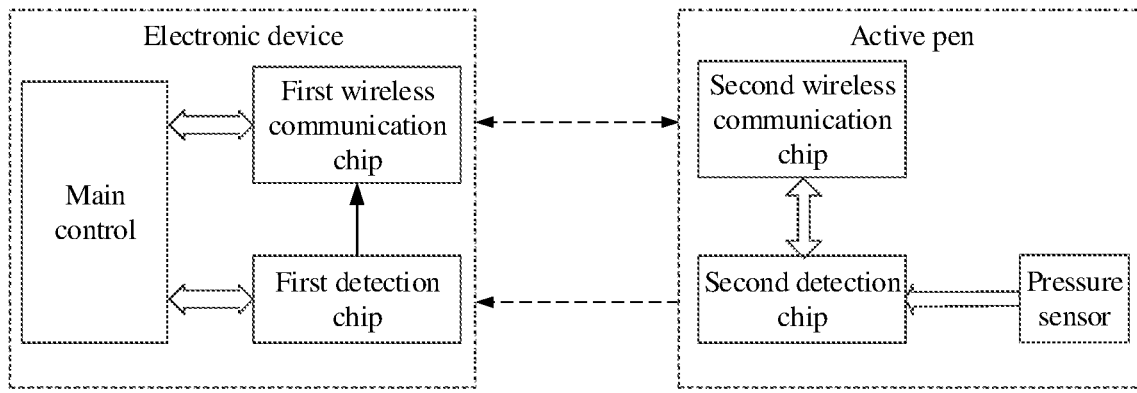
FIG. 3 is a process interaction diagram of a synchronization method in an embodiment of the present application.

FIG. 3 is a process interaction diagram of a synchronization method in an embodiment of the present application. Method 300 of FIG. 3 is configured for time synchronization between the first detection chip of the first device and the second detection chip of the second device. Optionally, the first device is one of the touch screen and the active pen of an electronic device, and the second device is the other of the touch screen and the active pen. For example, the first device is the touch screen and the second device is the active pen; or, the first device is the active pen and the second device is the touch screen.

Method 300 may be performed by the first detection chip of the first device, a first wireless communication chip connected to the first detection chip, the second detection chip of the second device, and a second wireless communication chip connected to the second detection chip.

Figure 4:
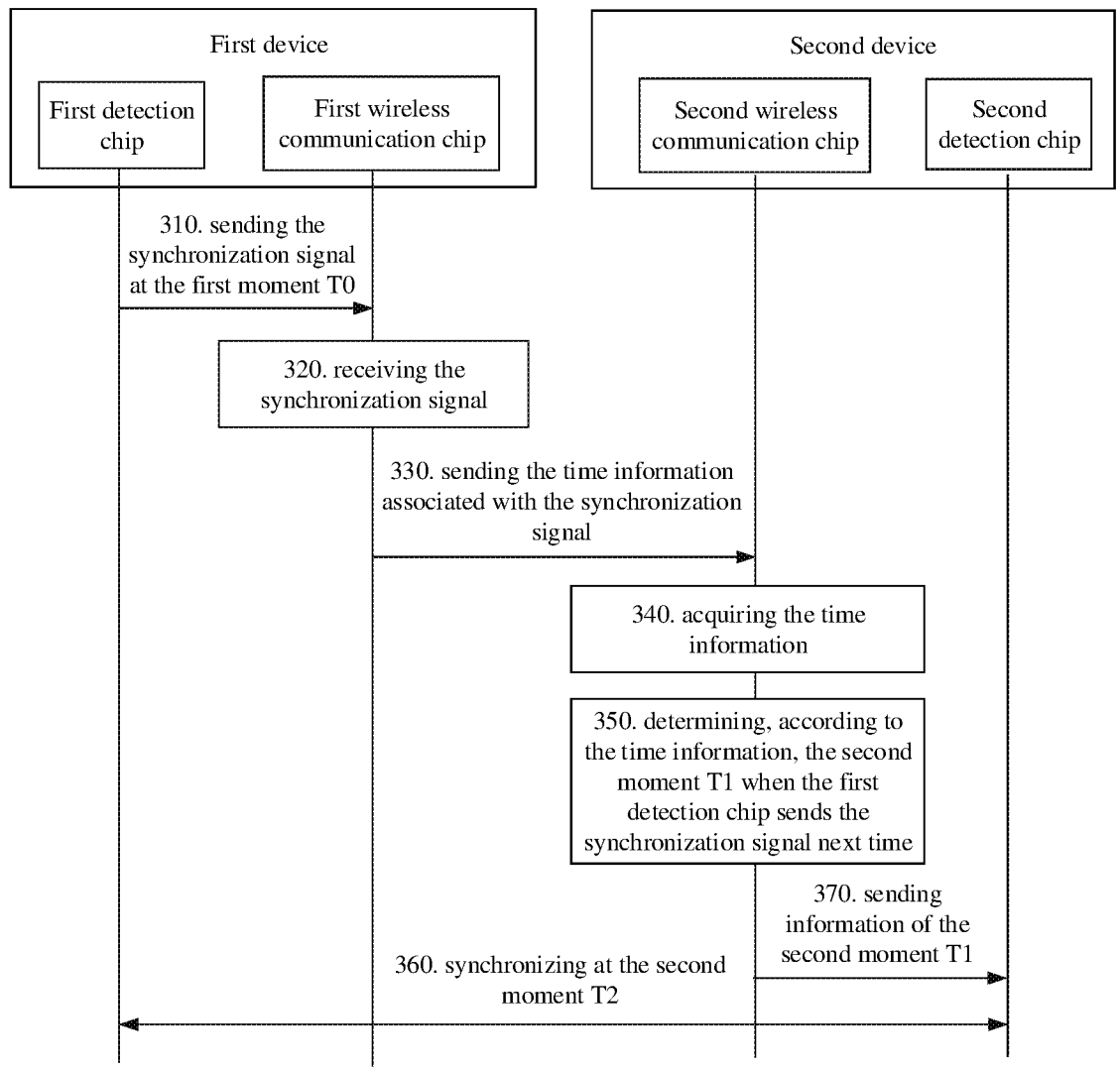
FIG. 4 is a schematic block diagram of a touch screen and an active pen in an embodiment of the present application.
Figure 5:
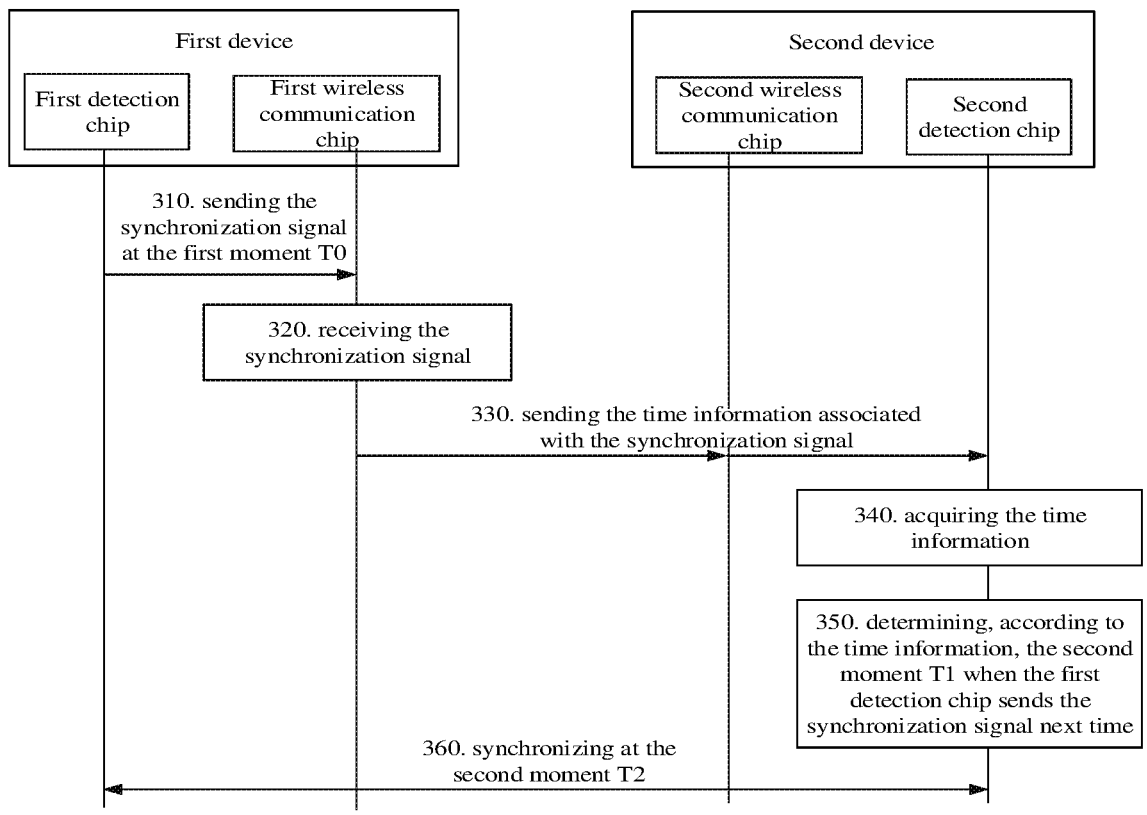
FIG. 5 is a schematic block diagram of a touch screen and an active pen in another embodiment of the present application.

For example, as shown in FIG. 4 and FIG. 5, when the first device is the touch screen in the electronic device and the second device is the active pen, the first wireless communication chip is the wireless communication chip in the electronic device, such as a bluetooth chip, a wireless fidelity (WIFI) chip, a wireless radio frequency (RF) chip, a near field communication (NFC) chip, etc.; and the first detection chip is a touch chip of the touch screen, that is, a touch panel integrated circuit (TP IC) for touch detection. Both the first detection chip and the first wireless communication chip may exchange information with a main control of the electronic device, such as a CPU, and the first detection chip may send a signal to the first wireless communication chip through an I/O interface. The second wireless communication chip is the wireless communication chip in the active pen, such as a bluetooth chip, a WIFI chip, an RF chip, an NFC chip, etc.; and the second detection chip is a driving chip of the active pen, which is configured to output the driving signal and detect an uplink signal output by the active pen. Signal transmission may be performed between the second detection chip and the second wireless communication chip through the I/O interface, and the second detection chip is also connected to a pressure sensor to detect the pressure information of the active pen.

Correspondingly, when the first device is the active pen and the second device is the touch screen, the first wireless communication chip is the wireless communication chip in the active pen, such as a bluetooth chip, a WIFI chip, an RF chip, an NFC chip, etc.; the first detection chip is the driving chip of the active pen; the second wireless communication chip is the wireless communication chip of the electronic device, such as a bluetooth chip, a WIFI chip, an RF chip, an NFC chip, etc.; and the second detection chip is a TP IC.

Wireless transmission may be performed between the first wireless communication chip and the second wireless communication chip. For example, data packet transmission may be performed based on a connection period agreed in the bluetooth protocol, also referred to as a connection interval. The above-mentioned bluetooth chip is, for example, a Bluetooth low energy (BLE) chip.

Signal transmission may be performed between the first detection chip and the second detection chip, for example, through the IO interface. For example, the active pen may emit the driving signal to the touch screen, and the touch screen may also send the uplink signal to the active pen.

The synchronization signal for synchronization in method 300 may be generated by either party of the first detection chip or the second detection chip, and the other party adjusts its own period to realize synchronization between the two. Hereinafter, it is assumed that the synchronization signal is periodically generated by the first detection chip during the synchronization process, and the synchronization signal is sent to the first wireless communication chip. As shown in FIG. 4 and FIG. 5, method 300 includes part or all of the following steps.

In step 310, the first detection chip sends the synchronization signal to the first wireless communication chip at a first moment TO.

In step 320, the first wireless communication chip receives the synchronization signal sent at the first moment TO by the first detection chip.

In step 330, the first wireless communication chip sends time information associated with the synchronization signal to the second wireless communication chip.

In step 340, the time information is acquired, where the time information is configured to determine a second moment T1 when the first detection chip sends the synchronization signal next time.

In step 350, according to the time information, the second moment T1 when the first detection chip sends the synchronization signal next time is determined.

In step 360, the second detection chip and the first detection chip are synchronized at the second moment T1.

Among the above steps, step 310 is performed by the first detection chip, steps 320 and 330 are performed by the first wireless communication chip, and steps 340 and 350 may be performed by the second wireless communication chip or the second detection chip. Among that, when steps 340 and 350 are performed by the second wireless communication chip, the second wireless communication chip may inform the second detection chip of the information of the second moment T1 determined by the second wireless communication chip, so that the second detection chip adjusts its period for sending the driving signal. For example, as shown in FIG. 4, before step 360, the second detection chip also performs step 370; when steps 340 and 350 are performed by the second detection chip, the second wireless communication chip may inform the second detection chip of the time information associated with the synchronization signal received by the second wireless communication chip; and the second detection chip determines the second moment T1 and adjusts its period for sending the driving signal. For example, as shown in FIG. 5, in step 330, after the second wireless communication chip acquires the time information, the time information is sent to the second detection chip; and in addition, steps 340 and 350 may also be performed by other modules with the data processing capability.

It may be seen that after the first wireless communication chip connected to the first detection chip receives the synchronization signal sent by the first detection chip at the first moment TO, the time information associated with the synchronization signal is sent to the second wireless communication chip connected to the second detection chip. The second device acquires the time information associated with the synchronization signal through the second wireless communication chip, and uses the first moment TO as a time anchor for sending the synchronization signal, that is, a time reference point, so as to determine, based on the first moment TO, the second moment T1 when the first detection chip sends the synchronization signal next time, thereby realizing synchronization between the second detection chip and the first detection chip at the second moment T1. Since the wireless communication chip is configured to realize the synchronization between the touch screen and the active pen, the delay caused by the synchronization manner of blindly detecting a driving signal of the active pen on the touch screen is avoided, and a position of a pen tip may be detected immediately when the active pen is close to the touch screen, which speeds up a response speed of the first writing of the active pen, and may maintain the touch screen and the active pen synchronized for a long time, and improve the user experience.

After the first detection chip and the second detection chip are synchronized at the second moment T1, signal transmission may be performed based on the second moment T1. For example, according to the agreed time, at the second moment T1 or after a specific duration taking the second moment T1 as a starting point, the active pen emits the driving signal to the touch screen, and the touch screen detects the driving signal within the same time; or at the second moment T1 or after the specific duration taking the second moment T1 as the starting point, the touch screen sends the uplink signal to the active pen, and the active pen detects the uplink signal at the same time.

Figure 6:
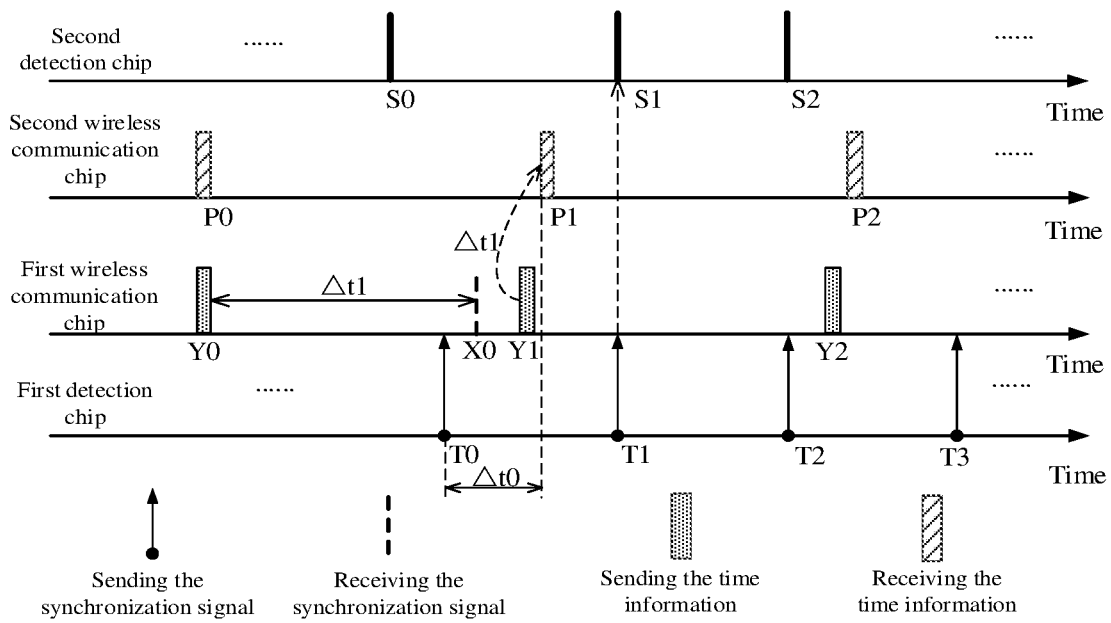
FIG. 6 is a schematic diagram of a signal timing of a synchronization method in an embodiment of the present application.

FIG. 6 shows a schematic diagram of one possible signal timing based on method 300. In FIG. 6, as an example, the first device is the touch screen, the second device is the active pen, and the synchronization signal is sent by the first detection chip. The second detection chip adjusts its period based on the time information associated with the synchronization signal to synchronize with the first detection chip.

In an implementation manner, the time information associated with the synchronization signal may be configured to determine a first time difference $\Delta t0$ between a third moment P1 when the second wireless communication chip receives the time information and the first moment T0, and the first time difference $\Delta t0$ is configured to determine the second moment T1.

That is, in step 350, determining, according to the time information associated with the synchronization signal, the second moment T1 when the first detection chip sends the synchronization signal next time, includes: determining, according to the time information, the first time difference $\Delta t0$ between the third moment P1 when the second wireless communication chip receives the time information and the first moment T0; and determining, according to the first time difference $\Delta t0$, the second moment T1.

The first time difference $\Delta t0$ is a time difference between a moment when the first detection chip sends the synchronization signal and a moment when the second wireless communication chip receives the synchronization signal. In other words, the first time difference $\Delta t0$ is a delay of the synchronization signal between the first device and the second device. When the first time difference $\Delta t0$ is determined based on the above time information, a transmission delay of the synchronization signal between the first device and the second device may be determined. Further, because the first detection chip sends the synchronization signal periodically, a time may be then determined when the first detection chip sends the synchronization signal next time.

That is, further, in step 350, determining, according to the first time difference $\Delta t0$, the second moment T1, includes: determining that the second moment T1 is located at a certain direction after the third moment P1, where the duration is equal to a difference value of a period length of the synchronization signal sent by the first detection chip and the first time difference $\Delta t0$. The period is a time difference T1-T0 between the second moment T1 and the first moment T0.

In an implementation manner, the first wireless communication chip performs data transmission with the second wireless communication chip based on its connection interval. As shown in FIG. 6, the time information associated with the synchronization signal sent by the first wireless communication chip to the second wireless communication chip may be a second time difference $\Delta t1$ between a fourth moment X0 when the first bluetooth chip receives the synchronization signal and a fifth the moment Y0 when the first wireless communication chip performs data transmission with the second wireless communication chip for the last time.

That is, the first wireless communication chip may send the second time difference $\Delta t1$ to the second wireless communication chip, so as to determine the first time difference $\Delta t0$ between the third moment P1 and the first moment T0. The first time difference $\Delta t0$ may be configured to determine the second moment T1. Specifically, the second moment T1 is delayed by a certain duration relative to the third moment P1; and the duration is a difference value between a period length when the first detection chip sends the synchronization signal and the first time difference $\Delta t0$.

In an implementation manner, the first time difference $\Delta t0$ may be equal to a difference value between the second time difference $\Delta t1$ and a preset value. Among that, the preset value, for example, may be equal to the sum of the following times: a length of the connection period between the first wireless communication chip and the second wireless communication chip; a data transmission time between the first wireless communication chip and the second wireless communication chip; and a delay between the fourth moment X0 and the first moment T0.

When the first wireless communication chip and the second wireless communication chip are bluetooth chips, based on the bluetooth protocol, data transmission is performed between the first wireless communication chip and the second wireless communication chip according to a certain connection period. For example, as shown in FIG. 6, data packet transmission is periodically performed between the first wireless communication chip and the second wireless communication chip according to the connection period at the Y0 moment, the Y1 moment, and the Y2 moment respectively. Even if no data needs to be transmitted, an empty data packet also needs to be transmitted between the first wireless communication chip and the second wireless communication chip to maintain synchronization between the two. This connection period is known and denoted as C0.

A data transmission time between the first wireless communication chip and the second wireless communication chip refers to a time required to transmit the data packet between the first wireless communication chip and the second wireless communication chip for one time, that is, a time to transmit the data packet in the air, such as a time difference between the third moment P1 and the moment Y1. The data transmission time is known and may be regarded as a constant, denoted as C1.

A delay between the fourth moment X0 and the first moment T0 refers to a time when the first wireless communication chip sends the synchronization signal in response to the first detection chip. Since the synchronization signal is triggered by a wired connection manner through the I/O interface, the first wireless communication chip may capture the synchronization signal at the fastest speed, and each response time may have a small jitter, for example, within 10 us. Therefore, it may be regarded as a stable delay constant, denoted as C2, which may be acquired by measurement.

To sum up, the preset value C may be C=C0+C1+C2. The first time difference $\Delta t0$ may be equal to a difference value between the second time difference $\Delta t1$ and the preset value C, that is, $\Delta t0=\Delta t1-C$.

Hereinafter, how to determine the second moment T1 may be described below in detail with reference to FIG. 6.

As an example, as shown in FIG. 6, the first device is the touch screen, the second device is the active pen, the synchronization signal is periodically sent by the first detection chip, and the second detection chip adjusts its period based on the time information associated with the synchronization signal, so as to realize synchronization with the first detection chip at the second moment T1.

The first detection chip is a TP IC, and the second detection chip is a driving chip. The first wireless communication chip and the second wireless communication chip are bluetooth chips, and data packet transmission between them is performed based on a certain connection period C0, for example, the data packet transmission is performed at the moment Y0, the moment Y1, the moment Y2, etc., and the moment Y0, the moment Y1, the moment Y2 are automatically recorded by a system clock of the bluetooth chip and are known time anchors.

The first detection chip of the touch screen sends the synchronization signal to the first wireless communication chip through the I/O interface using the wired connection manner at the moment T0, and the first wireless communication chip receives the synchronization signal at the moment X0, and there is a delay between the two, that is, $C2=X0-T0$. After receiving the synchronization signal, the first wireless communication chip immediately acquires a current moment X0, and calculates a delay $\Delta t1=X0-Y0$ of the moment X0 relative to Y0.

The first wireless communication chip sends a data packet carrying the time information $\Delta t1$ to the second wireless communication chip in a wireless transmission manner at the moment Y1, and the second wireless communication chip receives the data packet carrying the time information $\Delta t1$ at the moment P1. There is a delay between the two, that is, $C1=P1-Y1$.

Accordingly, the active pen may calculate the delay $\Delta t0$ of the moment P1 relative to the moment T0, that is, $\Delta t0=(P1-Y1)\pm(Y1-X0)\pm(X0-T0)$. Combining $\Delta t1=X0-Y0$, $\Delta t0=(P1-Y1)+(Y1-Y0-\Delta t1)\pm(X0-T0)=C1+(C0-\Delta t1)+C2=(C1+C0+C2)-\Delta t1$ may be acquired. Since C1, C0, and C2 are predictable constants, $\Delta t1$ is an unknown quantity, and $\Delta t0$ is related to $\Delta t1$. When $\Delta t1$ is known, $\Delta t0$ may be determined based on $\Delta t1$.

The active pen takes the moment T0 as a time anchor and the moment T1 as a synchronization target, and calculates a timing time of a starting point S1 of the next period of the second detection chip relative to the moment P1, that is, $S1-P1=T1-P1=(T1-T0)-\Delta t0=(T1-T0)-(C1+C0+C2)+\Delta t1$, where $T1-T0$ is a period when the first detection chip sends the synchronization signal, which is a known constant. It may be seen that as long as $\Delta t1$ is acquired, the active pen may derive the position at the second moment T1, so that the second detection chip and the first detection chip are synchronized at the moment T1, that is, the period starting point (the S1 moment) of the second detection chip and the period starting point (the T1 moment) of the first detection chip are aligned, thereby realizing synchronization between the active pen and the touch screen.

In the above synchronization method, each time length and its calculation in the process of deriving the second moment T1 with the first moment T0 as the time anchor may also have other equivalent transformations, which is not limited in the present application. Any process capable of deriving the time difference $\Delta t0$ between the moment P0 and moment T0 may be configured to determine moment T2.

Figure 7:
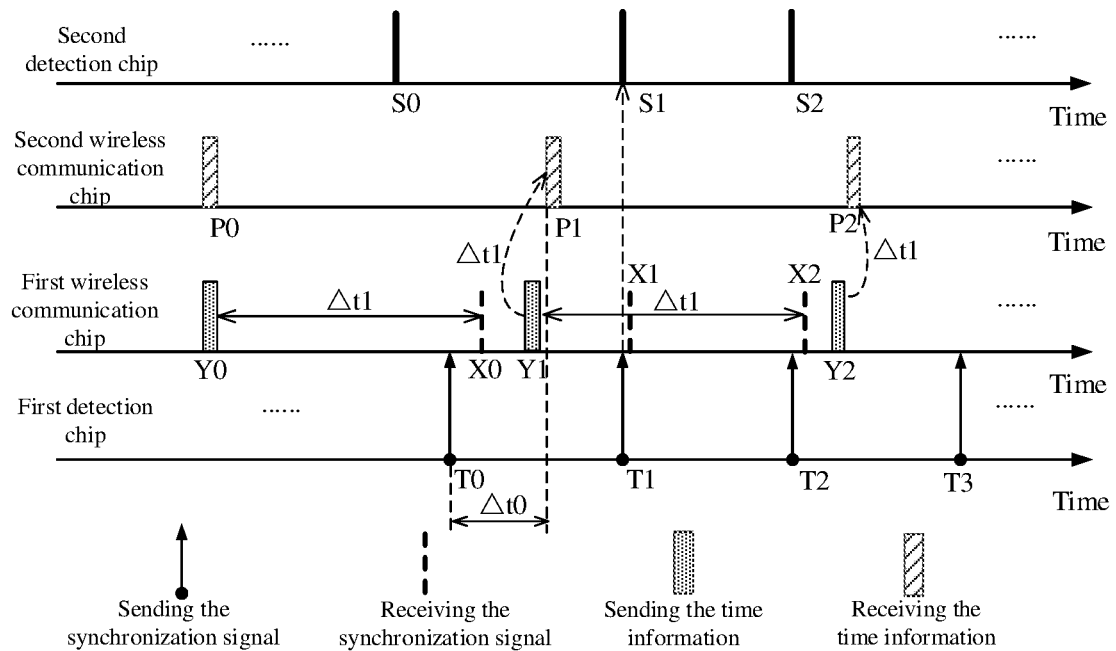
FIG. 7 is a schematic diagram of a signal timing of a synchronization method in an embodiment of the present application.

When the first wireless communication chip receives a plurality of synchronization signals within its connection period, optionally, synchronization may be performed based on the last synchronization signal received by the first wireless communication chip within the connection period. For example, as shown in FIG. 7, when the first wireless communication chip receives two synchronization signals at the moment X1 and the moment X2 respectively, the synchronization signal at the moment X1 should be discarded, and the synchronization signal at the moment X2 should be adopted to recalculate the position of the synchronization moment T3.

The synchronization solution in the embodiment of the present application may not only be applied to a synchronization scenario between the touch screen and the active pen, but also be applied to a synchronization scenario between any other two devices with a wireless communication function, to realize clock synchronization of the two.

Figure 8:
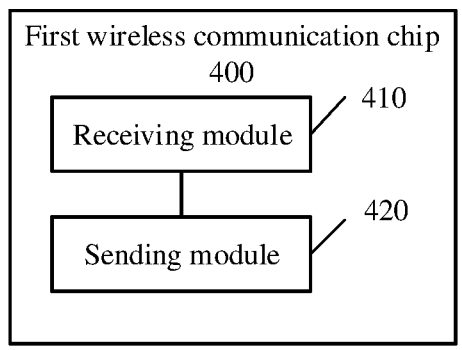
FIG. 8 is a schematic block diagram of a bluetooth chip in an embodiment of the present application.

FIG. 8 shows a wireless communications chip provided in an embodiment of the present application. The wireless communication chip is a first wireless communication chip connected to a first detection chip of a first device, and configured for time synchronization between the first detection chip and a second detection chip of a second device, the first device is one of a touch screen and an active pen of an electronic device, the second device is the other of the touch screen and the active pen, and the first detection chip periodically sends a synchronization signal. As shown in FIG. 8, the first wireless communication chip 400 includes:
 a receiving module 410, configured to receive the synchronization signal sent by the first detection chip at a first moment; and
 a sending module 420, configured to send time information associated with the synchronization signal to a second wireless communication chip connected to the second detection chip, where the time information is configured to determine a second moment for the first detection chip to send the synchronization signal next time, so that the second detection chip is synchronized with the first detection chip at the second moment.

After the first wireless communication chip in the embodiment receives the synchronization signal sent by the first detection chip at the first moment, the time information associated with the synchronization signal will be sent to the second wireless communication chip. The second device acquires the time information associated with the synchronization signal through the second wireless communication chip, and uses the first moment as the time anchor for sending the synchronization signal, so as to determine, based on the first moment, the second moment when the first detection chip sends the synchronization signal next time, thereby realizing synchronization between the second detection chip and the first detection chip at the second moment. Since the wireless communication chip is configured to realize the synchronization between the touch screen and the active pen, the delay caused by the synchronization manner of blindly detecting a driving signal of the active pen on the touch screen is avoided, and a position of a pen tip may be detected immediately when the active pen is close to the touch screen, which speeds up a response speed of the first writing of the active pen, and may maintain the touch screen and the active pen synchronized for a long time, and improve the user experience.

In an implementation manner, the time information is configured to determine a first time difference between a third moment when the second wireless communication chip receives the time information and the first moment, where the first moment different is configured to determine the second moment.

In an implementation manner, the second moment is located at a certain duration after the third moment, and the duration is equal to a difference value of a period length of the synchronization signal sent by the first detection chip and the first time difference.

In an implementation manner, the first wireless communication chip performs data transmission with the second wireless communication chip based on its connection period, and the time information is a second time difference between a fourth moment when the first wireless communication chip receives the synchronization signal and a fifth moment when the first wireless communication chip performs data transmission with the second wireless communication chip for the last time.

In an implementation manner, the first time difference is equal to a difference value between the second time difference and a preset value, where the preset value is equal to the sum of the following times: a length of the connection period; a data transmission time between the first wireless communication chip and the second wireless communication chip; and a delay between the fourth moment and the first moment.

In an implementation manner, the synchronization signal is the last synchronization signal received by the first wireless communication chip within the connection period.

In an implementation manner, the first wireless communication chip and the second wireless communication chip are any one of the following: a BLE chip, a WIFI chip, an RF chip, and an NFC chip.

It should be understood that for the specific process of the synchronization operation performed by the first wireless communication chip and the beneficial effects generated, reference may be made to the relevant descriptions in the method embodiments, which are not repeated here for brevity.

Figure 9:
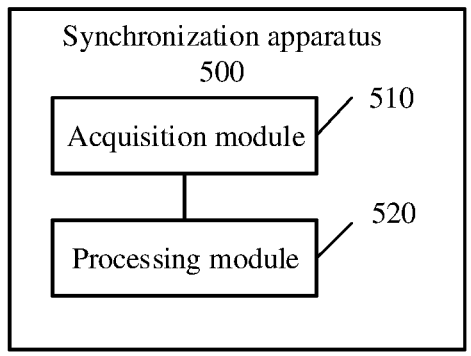
FIG. 9 is a schematic block diagram of a synchronization apparatus in an embodiment of the present application.

FIG. 9 shows a synchronization apparatus provided in an embodiment of the present application. The synchronization apparatus, for example, may the above second wireless communication chip or the second detection chip. The synchronization apparatus is configured for time synchronization between the first detection chip of the first device and the second detection chip of the second device, the first detection chip periodically sending the synchronization signal. As shown in FIG. 9, a synchronization apparatus 500 includes:

an acquisition module 510, configured to acquire time information associated with the synchronization signal sent by the first wireless communication chip connected to the first detection chip to the second wireless communication chip connected to the second detection chip, where the synchronization signal is sent by the first detection chip at a first moment; and a processing module 520, configured to determine, according to the time information, a second moment for the first detection chip to send the synchronization signal next time, so that the second detection chip is synchronized with the first detection chip at the second moment.

The second wireless communication chip in the embodiment may receive the time information associated with the synchronization signal sent by the first wireless communication chip connected to the first detection chip, and the synchronization signal is by the first detection chip sent at the first moment. The second device acquires the time information associated with the synchronization signal through the second wireless communication chip, and uses the first moment as a time anchor for sending the synchronization signal, so as to determine, based on the first moment, the second moment when the first detection chip sends the synchronization signal in the next period, thereby realizing synchronization between the second detection chip and the first detection chip at the second moment. Since the wireless communication chip is configured to realize the synchronization between the touch screen and the active pen, the delay caused by the synchronization manner of blindly detecting a driving signal of the active pen on the touch screen is avoided, and a position of a pen tip may be detected immediately when the active pen is close to the touch screen, which speeds up a response speed of the first writing of the active pen, and may maintain the touch screen and the active pen synchronized for a long time, and improve the user experience.

In an implementation manner, the processing module 520 is specifically configured to: determine, according to the time information, a first time difference between a third moment when the second wireless communication chip receives the time information and the first moment, and determine, according to the first time difference, the second moment.

In an implementation manner, the processing module 520 is specifically configured to: determine that the second moment is located at certain duration after the third moment, where the duration is equal to a difference value of a period length of the synchronization signal sent by the first detection chip and the first time difference.

In an implementation manner, the first wireless communication chip performs data transmission with the second wireless communication chip based on its connection period, and the time information is a second time difference between a fourth moment when the first wireless communication chip receives the synchronization signal and a fifth moment when the first wireless communication chip performs data transmission with the second wireless communication chip for the last time.

In an implementation manner, the first time difference is equal to a difference value between the second time difference and a preset value, where the preset value is equal to the sum of the following times: a length of the connection period; a data transmission time between the first wireless communication chip and the second wireless communication chip; and a delay between the fourth moment and the first moment.

In an implementation manner, the synchronization signal is the last synchronization signal received by the first wireless communication chip within the connection period.

In an implementation manner, the first wireless communication chip and the second wireless communication chip are any one of the following: a BLE chip, a WIFI chip, an RF chip, and an NFC chip.

In an implementation manner, the first device is one of a touch screen and an active pen of an electronic device, and the second device is the other of the touch screen and the active pen.

It should be understood that for the specific process of the synchronization operation performed by the synchronization apparatus and the beneficial effects generated, reference may be made to the relevant descriptions in the method embodiments, which are not repeated here for brevity.

The present application also provides a synchronization apparatus, including a processor and a memory, the memory configured to store a computer program, and the processor configured to invoke and run the computer program stored in the memory, to perform the method performed by the first wireless communication chip in any one of the above embodiments.

The present application also provides a synchronization apparatus, including a processor and a memory, the memory configured to store a computer program, and the processor configured to invoke and run the computer program stored in the memory, to perform the method performed by the wireless device, such as the second wireless communication chip or the second detection chip, in any one of the above embodiments.

The present application also provides an electronic device, including the above first wireless communication chip and the first detection chip; or, including the above second wireless communication chip and the second detection chip.

The present application also provides an active pen, including the above first wireless communication chip and the first detection chip; or, including the above second wireless communication chip and the second detection chip.

It should be noted that, in a case of no conflict, the various embodiments and/or the technical features in the various embodiments described in the present application may be combined with each other arbitrarily, and the technical solutions acquired after the combination should also fall within the protection scope of the present application.

The system, apparatus, and method disclosed in the embodiments of the present application may be implemented in other manners. For example, some features of the method embodiments described above may be ignored or not implemented. The apparatus embodiments described above are merely exemplary. The division of the units is merely a logic function division, other division manners may exist in practical implementation. A plurality of units or components may be combined or integrated to another system. In addition, coupling between various units or coupling between various components may be direct coupling or indirect coupling, and the foregoing coupling includes a connection in electrical, mechanical or other forms.

A person skilled in the art may clearly understand that, for convenience and simplicity of description, the specific working processes and the achieved technical effects of the apparatus and the device described above may refer to corresponding processes and technical effects in the foregoing method embodiments, which will not be described redundantly herein.

It should be understood that the specific examples in the embodiments of the present application are only to help those skilled in the art to better understand the embodiments of the present application, but not to limit the scope of the embodiments of the present application. Various modifications and variations which fall within the protection scope of the present application may be made by those skilled in the art based on the foregoing embodiments.

The foregoing descriptions are merely specific implementation manners of the present application. However, the protection scope of the present application is not limited thereto, and those skilled in the art who are familiar with the art could readily think of variations or substitutions within the technical scope disclosed by the present application, and these variations or substitutions shall fall within the protection scope of the present application. Therefore, the protection scope of the present application shall be subject to the protection scope of the claims.

What is claimed is:

1. A synchronization method, configured for time synchronization between a first detection chip of a first device and a second detection chip of a second device, wherein the first detection chip periodically sending a synchronization signal, one of the first detection chip and the second detection chip is a touch chip of a touch screen, and the other of the first detection chip and the second detection chip is a driving chip of an active pen for outputting a driving signal and detecting an uplink signal output by the touch screen, signal transmission is performed between the first detection chip and a first wireless communication chip through an I/O interface, and signal transmission is performed between the second detection chip and a second wireless communication chip through an I/O interface, the method comprising:

receiving by the first wireless communication chip connected to the first detection chip, the synchronization signal sent by the first detection chip in a wireless transmission manner at a first moment;

sending, by the first wireless communication chip, time information associated with the synchronization signal to the second wireless communication chip connected to the second detection chip through wireless communication;

using, by the second detection chip or the second wireless communication chip, the time information associated with the synchronization signal, to determine a second moment for the first detection chip to send the synchronization signal next time; and then adjusting, by the second detection chip, its detection period based on the second moment, wherein the second detection chip is synchronized with the first detection chip at the second moment;

wherein the time information associated with the synchronization signal is configured for determining a first time difference between a third moment when the second wireless communication chip receives the time information and the first moment, wherein the first time difference is configured for determining the second moment;

wherein the first wireless communication chip performs data transmission with the second wireless communication chip based on its connection period, wherein the time information associated with the synchronization signal is obtained by determining a second time difference between a fourth moment when the first wireless communication chip receives the synchronization signal and a fifth moment when the first wireless communication chip performs data transmission with the second wireless communication chip for the last time;

wherein the first time difference is obtained by determining a difference value between the second time difference and a target value, wherein the target value is equal to the sum of the following times: a length of the connection period; a data transmission time between the first wireless communication chip and the second wireless communication chip; and a delay between the fourth moment and the first moment.

2. The synchronization method according to claim 1, wherein the second moment is located at a certain duration after the third moment, and the duration is equal to a difference value of a period length of the synchronization signal sent by the first detection chip and the first time difference.

3. The synchronization method according to claim 1, wherein the synchronization signal is the last synchronization signal received by the first wireless communication chip within the connection period.

4. The synchronization method according to claim 1, wherein the first wireless communication chip and the second wireless communication chip is any one of the following:
a Bluetooth Low Energy (BLE) chip, a wireless fidelity (WIFI) chip, a wireless radio frequency (RF) chip, and a near field communication (NFC) chip.

5. The synchronization method according to claim 1, wherein after the first detection chip and the second detection chip are synchronized at the second moment, signal transmission is performed based on the second moment; and
according to the agreed time, at the second moment or after a specific duration taking the second moment as a starting point, the active pen emits the driving signal to the touch screen, and the touch screen detects the driving signal within the same time; or, at the second moment or after the specific duration taking the second moment as the starting point, the touch screen sends the uplink signal to the active pen, and the active pen detects the uplink signal at the same time.

6. A synchronization apparatus, comprising a processor and a memory, wherein the memory is configured to store a computer program; and the processor is configured to invoke and run the computer program stored in the memory, to perform the synchronization method according to claim 1.

7. The synchronization apparatus according to claim 6, wherein the second moment is located at a certain duration after the third moment, and the duration is equal to a difference value of a period length of the synchronization signal sent by the first detection chip and the first time difference.

8. A synchronization method, configured for time synchronization between a first detection chip of a first device and a second detection chip of a second device, wherein the first detection chip periodically sending a synchronization signal, one of the first detection chip and the second detection chip is a touch chip of a touch screen, and the other of the first detection chip and the second detection chip is a driving chip of an active pen for outputting a driving signal and detecting an uplink signal output by the touch screen, signal transmission is performed between the first detection chip and a first wireless communication chip through an I/O interface, and signal transmission is performed between the second detection chip and a second wireless communication chip through an I/O interface, the method comprising:
 acquiring by the second detection chip or the second wireless communication chip, in a wireless transmission manner, time information associated with the synchronization signal sent by the first wireless communication chip connected to the first detection chip to the second wireless communication chip connected to the second detection chip, wherein the synchronization signal is sent by the first detection chip at a first moment to the first wireless communication chip;
 determining by the second detection chip or the second wireless communication chip, according to the time information associated with the synchronization signal, a second moment for the first detection chip to send the synchronization signal next time; and
 synchronizing the second detection chip with the first detection chip at the second moment;
 wherein according to the time information, determining the second moment when the first detection chip sends the synchronization signal next time comprises:
  determining, according to the time information, a first time difference between a third moment when the second wireless communication chip receives the time information and the first moment; and
  determining, according to the first time difference, the second moment;

wherein the first wireless communication chip performs data transmission with the second wireless communication chip based on its connection period, and acquiring the time information comprises acquiring a second time difference between a fourth moment when the first wireless communication chip receives the synchronization signal and a fifth moment when the first wireless communication chip performs data transmission with the second wireless communication chip for the last time;
wherein determining the first time difference comprises determining a difference value between the second time difference and a target value, wherein the target value is equal to the sum of the following times: a length of the connection period; a data transmission time between the first wireless communication chip and the second wireless communication chip; and a delay between the fourth moment and the first moment.

9. The synchronization method according to claim 8, wherein the determining, according to the first time difference, the second moment, comprises:
 determining that the second moment is located after a certain duration of the third moment, wherein the duration is equal to a difference value of a period length of the synchronization signal sent by the first detection chip and the first time difference.

10. The synchronization method according to claim 8, wherein the synchronization signal is the last synchronization signal received by the first wireless communication chip within the connection period.

11. The synchronization method according to claim 8, wherein the first wireless communication chip and the second wireless communication chip is any one of the following:
 a Bluetooth Low Energy (BLE) chip, a wireless fidelity (WIFI) chip, a wireless radio frequency (RF) chip, and a near field communication (NFC) chip.

12. The synchronization method according to claim 8, wherein the synchronization method is performed by the second wireless communication chip or the second detection chip.

13. The synchronization apparatus according to claim 8, wherein after the first detection chip and the second detection chip are synchronized at the second moment, signal transmission is performed based on the second moment; and
 according to the agreed time, at the second moment or after a specific duration taking the second moment as a starting point, the active pen emits the driving signal to the touch screen, and the touch screen detects the driving signal within the same time; or, at the second moment or after the specific duration taking the second moment as the starting point, the touch screen sends the uplink signal to the active pen, and the active pen detects the uplink signal at the same time.

\* \* \* \* \*